United States Patent [19]

Stidham

[11] 4,354,810
[45] Oct. 19, 1982

[54] APPARATUS FOR DISTRIBUTING A FOAMED COMPOSITION ON A SUBSTRATE

[75] Inventor: Warren D. Stidham, Hixson, Tenn.

[73] Assignee: Polysar Incorporated, Akron, Ohio

[21] Appl. No.: 209,656

[22] Filed: Nov. 24, 1980

[51] Int. Cl.³ ............................................. B29C 15/00
[52] U.S. Cl. ...................................... 425/91; 425/96; 425/101; 425/122; 425/817 C; 118/102; 118/103; 118/120
[58] Field of Search ............... 118/102, 101, 103, 120, 118/123, 126, 413; 156/78, 581; 264/46.3, 46.8; 425/817 C, 91, 96, 101, 122

[56] References Cited

U.S. PATENT DOCUMENTS

| | | | |
|---|---|---|---|
| 2,154,643 | 4/1939 | Steren et al. | 118/123 X |
| 2,910,040 | 10/1959 | Agahd | 118/120 |
| 2,910,724 | 11/1959 | Grajeck | 118/413 X |
| 3,007,205 | 11/1961 | House | 156/78 X |
| 3,181,199 | 5/1965 | Voelker | 156/78 X |
| 4,278,482 | 7/1981 | Poteet et al. | 156/78 |

FOREIGN PATENT DOCUMENTS 1241800 8/1971 United Kingdom.

Primary Examiner—John P. McIntosh
Attorney, Agent, or Firm—Stevens, Davis, Miller & Mosher

[57] ABSTRACT

An apparatus is disclosed for continuous distribution of a latex or urethane foam composition on a movable substrate to produce a foamed sheet material such as a foam backed carpet. The distribution apparatus comprises a generally cylindrically shaped rotatable member and at least two attached distribution means which may take the form of either modified doctor rolls or modified doctor blades. The distribution surface of each of these distribution means may differ and may be either smooth or patterned with a variety of grooves or serrations thereby providing means for producing foamed sheet materials with surfaces which are either planar or patterned with ridges and valleys. Means are also provided to readily change the thickness of the distributed foam and for oscillating the distribution apparatus to produce a surface with wavy as opposed to linear patterns of ridges and valleys. All of these operations may be accomplished without interrupting the continuous process.

10 Claims, 9 Drawing Figures

APPARATUS FOR DISTRIBUTING A FOAMED COMPOSITION ON A SUBSTRATE

BACKGROUND OF THE INVENTION

1. Field of the Invention

The present invention relates to the manufacture of foamed sheet material and pertains particularly to an apparatus and method for distributing a foamed fluid composition on a movable substrate to produce a foamed sheet material.

2. Discussion of the Prior Art

It is known to apply a viscous foamed fluid composition to a movable substrate and then, as necessary subsequently, to dry and cure the foamed composition. Such processes are used to produce foamed sheet materials, such as foam backed carpet and foam underlays for carpets. The foamed fluid composition may be a latex or a urethane. Previously such foamed compositions have been applied to the substrate and then distributed across the substrate by methods well known to the art using doctor blades or doctor rolls. It is desirable at times to provide a surface pattern on the foamed sheet material so produced. In the past a second step was necessary to produce this pattern since the doctor blades or rolls had smooth distribution edges or surfaces, thereby producing a foamed sheet material with a planar surface. To perform this second step, a variety of embossing techniques were developed, such as that taught in U.S. Pat. No. 3,210,447. In addition to being two-step processes requiring a high degree of control and coordination between the steps, all of these techniques had the added disadvantages of design inflexibility and high tooling cost in the embossing apparatus and wastage of the foamed composition where it was compressed by the embossed indentations.

An improved method and apparatus for producing patterned foam sheet materials were developed in U.K. Pat. No. 1,241,800, wherein the distribution and the pattern forming steps were combined. A series of doctor blades with lower edges having a variety of notches, cut-out parts, or protrusions were used to distribute the foamed composition and simultaneously produce a pattern of ridges and valleys on the surface of the foamed sheet material. A wide variety of patterns could be produced with tooling costs substantially lower than with embossing techniques and without wasting the foamed composition in embossed indentations. However, the specification provided no clear teaching on the mechanism used for moving the blades into and away from the distribution position nor on the methods used for mounting the blades. Additionally, there was no teaching on methods which could be used for substituting one or more blades for blades already mounted on the apparatus without stopping the process to make these substitutions nor was there any teaching on distribution means other than doctor blades.

The present invention is an improvement upon this prior art and seeks to overcome the limitations in its teachings. It is an object of the present invention to provide an improved apparatus and method for distributing a foamed fluid composition on a movable substrate in a one-step continuous operation producing a sequence of foamed sheet materials whose surfaces may be planar or variously patterned, wherein the distribution means and the pattern forming means are combined and may be either a doctor blade or a doctor roll and wherein the distribution means may be readily changed without interrupting the continuous process.

SUMMARY OF THE INVENTION

The present invention provides an apparatus for distributing a viscous foamed fluid composition which has been applied to a movable substrate which comprises a rotatable member and at least two distribution means wherein said member is a tubular roll with a generally cylindrical shape, means cooperating with said member to readily attach and detach said distribution means, said distribution means being attached to said member in a radially outwardly extending manner so that the most radially distant surface of each of said distribution means is a distribution surface for distributing said composition on said substrate, said distribution means being attached to said member so that at any given time the distribution surface of only one of said distribution means is in position for distributing said composition on said substrate, each of said distribution surfaces imparting essentially the final surface pattern to said composition when used for distributing said composition, said member being positioned above and extending substantially across the surface of said substrate normal to the direction of travel of said substrate, means cooperating with said member to raise and lower said member perpendicular to the surface of said substrate, means cooperating with said member to rotate said member about the central axis of said member and normal to the direction of travel of said substrate through an angle of one or two times 360° divided by the number of said distribution means, locking means cooperating with said member to prevent rotation of said member, and means cooperating with said member to oscillate said member from side to side normal to the direction of travel of said substrate.

The present invention also provides a method for distributing a viscous foamed fluid composition on a movable substrate which comprises applying said composition to said substrate, passing said substrate beneath an apparatus as hereinbefore defined, and contacting said composition with a distribution surface of said apparatus thereby producing a foamed sheet material.

Preferred embodiments of the present invention are detailed more fully in the following description when considered in conjunction with the accompanying drawings.

DESCRIPTION OF THE PREFERRED EMBODIMENTS

Figure 1:
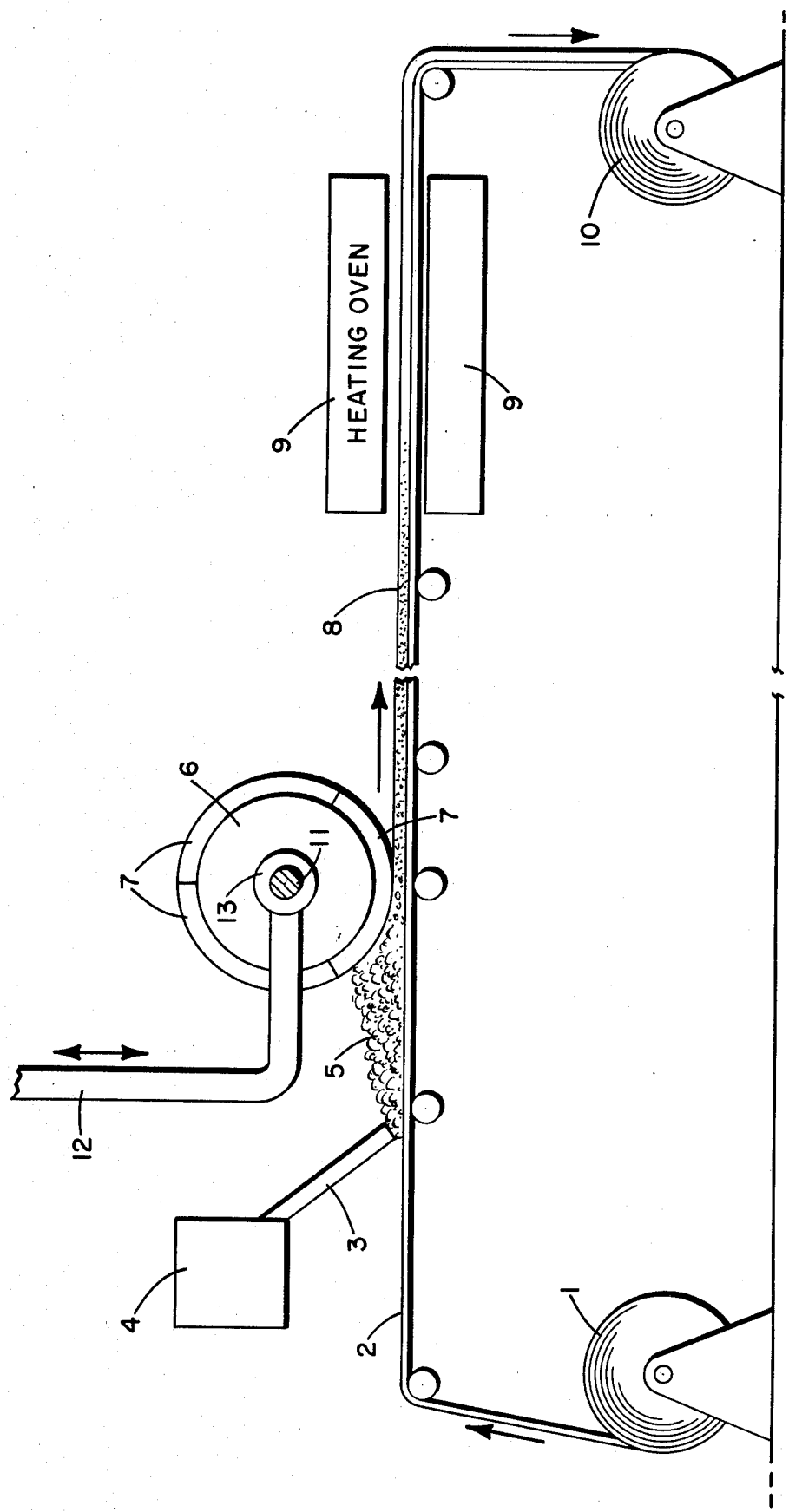
FIG. 1 is a schematic in side elevation of an apparatus for applying and distributing a foamed fluid composition on a movable substrate.

In FIG. 1 a substrate 2 is delivered from a feed roll 1 to pass beneath a foam supply nozzle 3, the foam supply nozzle being supplied from a reservoir 4 with a foamed fluid composition 5 which may be a latex or a urethane. The substrate bearing the foamed composition passes beneath a distribution apparatus which comprises a rotatable member 6 and at least two attached distribution means 7 which distribute the foamed composition on the substrate to form a foamed sheet material 8. This foamed sheet material may then pass through other pieces of equipment such as a heating oven 9 to dry and cure the foamed portion before being taken up by the takeup roll 10. The rotatable member 6 is a tubular roll with a generally cylindrical shape which is preferably made from nickel or chrome plated carbon steel. A small shaft 11 protrudes from each end of the central axis of the rotatable member. This shaft is the point of attachment which allows the rotatable member to cooperate with various means to move the member or to prevent it from moving. Thus, each end of the shaft is supported by a set of bearings 13 which will allow the shaft to rotate about its axis and also oscillate parallel to the surface of the substrate. The sets of bearings are attached to a supporting frame 12.

Figure 1A:
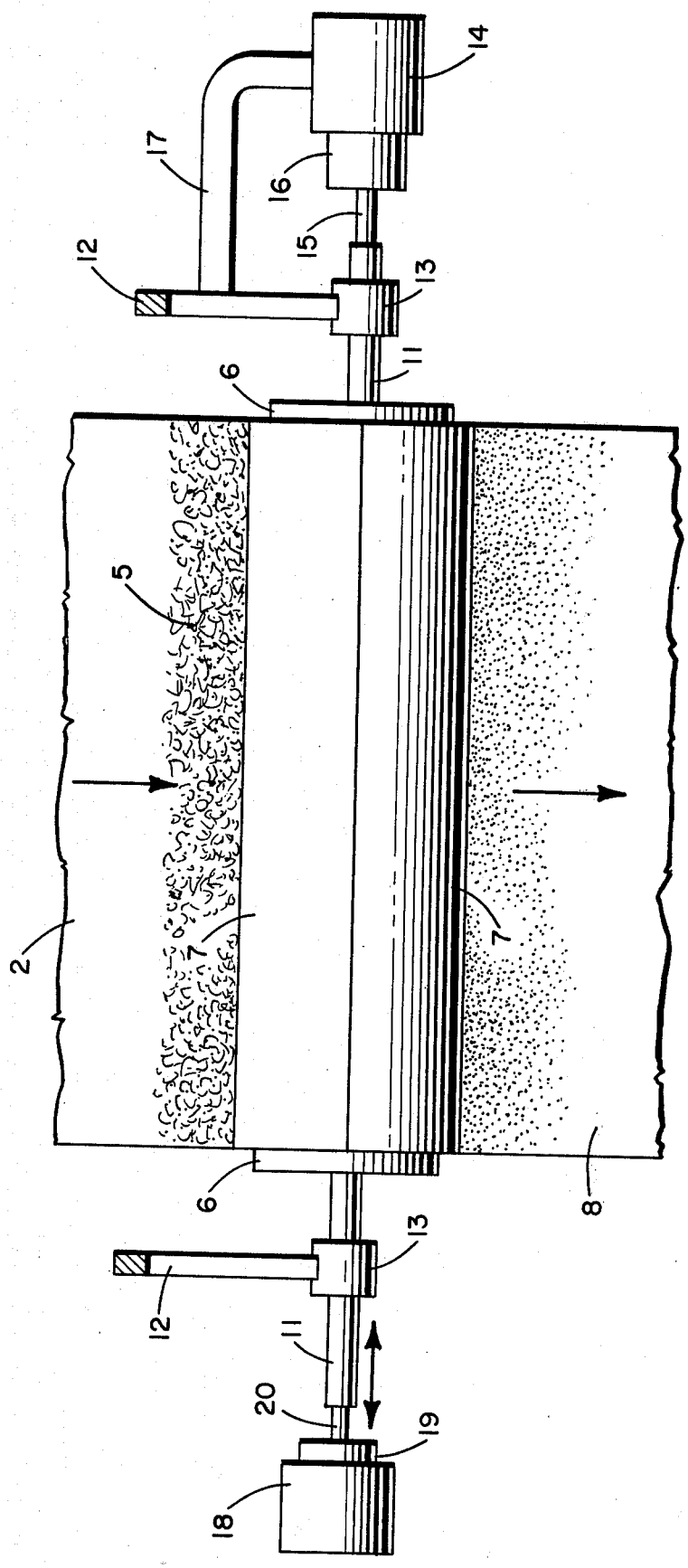
FIG. 1A is a schematic top plan view of the distribution apparatus of FIG. 1.

FIG. 1A shows means cooperating with the rotatable member 6 to rotate the member about its central axis and normal to the direction of travel of the substrate through an angle of one or two times 360° divided by the number of distribution means attached to the rotatable member. A convenient means is motor 14 which is coupled to the shaft 11 by a flexible shaft 15. Also shown is a braking means 16 which cooperates with the rotatable member to prevent its rotation by locking shaft 15 in position whenever desired. The motor 14 is supported by a frame member 17 which is connected to supporting frame 12. Frame 12 is constructed in any convenient manner so that it may be raised or lowered perpendicular to the surface of the substrate, thereby providing means cooperating with the rotatable member to raise and lower said member. Means cooperating with the rotatable member to oscillate said member from side to side normal to the direction of travel of the substrate are also shown in FIG. 1A. A convenient means is a cylinder 18 having a movable piston 19, operated for example by hydraulic pressure, which operates on shaft 11 through shaft 20 whereby the rotatable member 6 with its attachments is movable through bearings 13 so as to provide the oscillating motion.

Figure 2:
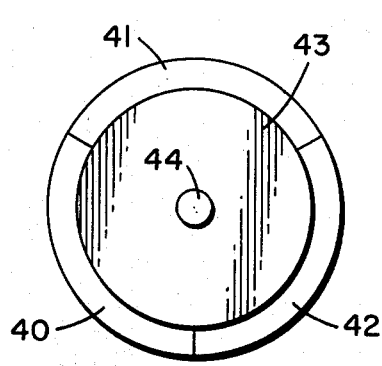
FIG. 2 is an end elevational view of a doctor roll comprising a cylindrical rotatable member with attached distribution sleeve members.
Figure 3:
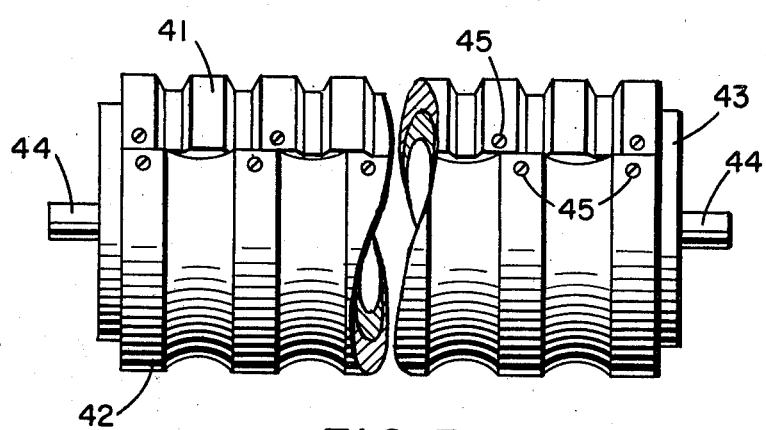
FIG. 3 is a side elevational view of the apparatus shown in FIG. 2.

The distribution apparatus shown in FIG. 1 is in the form of one of the preferred embodiments of this apparatus. FIGS. 2 and 3 show two views of this preferred embodiment which is a modified doctor roll comprising a cylindrical rotatable member 43 of circular cross section having a number of attached distribution means comprising longitudinal arcuate sections which are of about equal length to and concentric with the rotatable member and whose inner surfaces conform with the external surface of the rotatable member 43. These sections, hereinafter referred to as sleeve members, may vary in number from at least 2 to about 4 and are preferrably made from nylon or stainless steel. FIG. 2 shows the preferred embodiment of 3 sleeve members 40, 41 and 42. FIG. 3 shows that the sleeve members 41 and 42 are attached to the rotatable member by suitable means 45 so that any sleeve member may be readily attached to or detached from the rotatable member. The preferred means for attaching the sleeve members are bolts which screw into corresponding threaded taps in the rotatable member. Thus the sleeve members are attached to the rotatable member in a radially outwardly extending manner so that as shown in FIG. 1, their most radially distant surface may be used as a distribution surface for distributing the foamed fluid composition on the substrate. The rotatable member should be rotated to a position as shown in FIG. 1 so that at any given time the distribution surface of only one of the sleeve members 40–42 is in position for distributing the foamed composition on the substrate.

It is often desirable to produce a foamed sheet material which has a surface pattern. This can be accomplished using the preferred embodiment of the distribution apparatus shown in FIGS. 2 and 3 wherein the distribution surfaces of the sleeve member distribution means are grooved parallel to the direction of travel of the substrate. Two preferred embodiments of grooved sleeve members are shown in FIG. 3. Sleeve member 41 has grooves which in longitudinal cross section are separated repeating uniform radially inwardly extending arcs. Sleeve member 42 has grooves which in longitudinal cross section are separated repeating uniform radially inwardly extending truncated "V" indentations. Thus, each of the distribution surfaces may be dissimilar. Since the distribution surface of the sleeve member which is being used to distribute the foamed composition will of necessity impart the final surface pattern to the foamed sheet material, different distribution surfaces will produce different surface patterns. A sleeve member with a smooth distribution surface may be used to produce a planar foamed sheet.

During the distribution process, the distribution surface of the sleeve member being used to distribute the foamed composition may become fouled by foamed material drying upon it over a period of time. When attached to the rotatable member, a new sleeve member with a clean distribution surface and the same groove pattern as that which has become fouled may be rotated quickly into place by rotating the central shaft 44 of the rotatable member shown in FIGS. 2 and 3 without stopping the distribution process. The fouled surface may then be cleaned or the entire sleeve member may be detached, cleaned and reattached, or replaced by a new sleeve member. Similarly, if it is desired to change the surface pattern which is imparted to the foamed sheet material, the rotatable member may be quickly rotated to bring a new sleeve member into position having a differently grooved distribution surface. A smooth distribution surface may replace a grooved surface or vice versa, thereby providing means to change between planar and patterned surfaces for the foamed sheet whenever desired without stopping the overall process.

The thickness at which the foamed composition is distributed may be changed using the preferred embodiment of the distribution apparatus shown in FIGS. 2 and 3 by raising or lowering the rotatable member as already described in connection with FIG. 1. The central shaft 44 shown in FIGS. 2 and 3 is the point of attachment as described in relation to the shaft 11 shown in FIG. 1. However, it should be noted that side to side oscillation of this modified doctor roll distribution apparatus is not recommended. Because the large area of contact between the distribution surface and the foamed composition imparts undesirably irregular patterns to the surface of the foamed sheet material.

Figure 4:
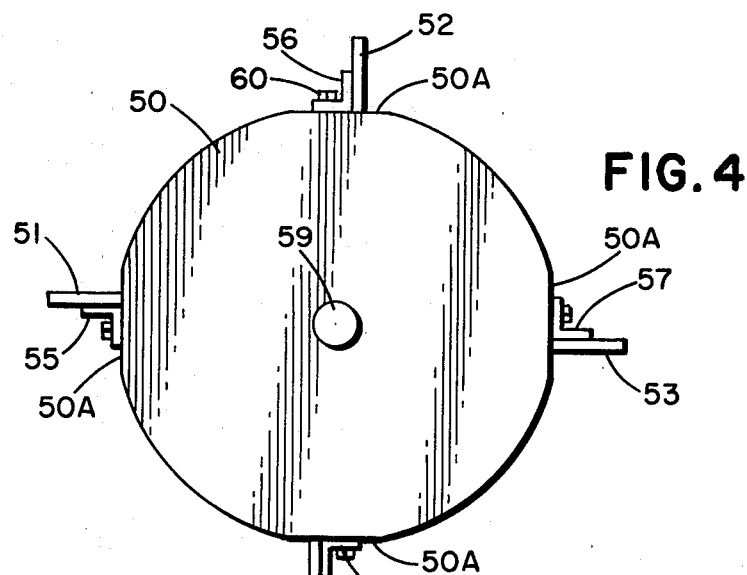
FIG. 4 is an end elevational view of a modified doctor blade distribution apparatus comprising a cylindrical rotatable member with attached distribution blade members.
Figure 5:
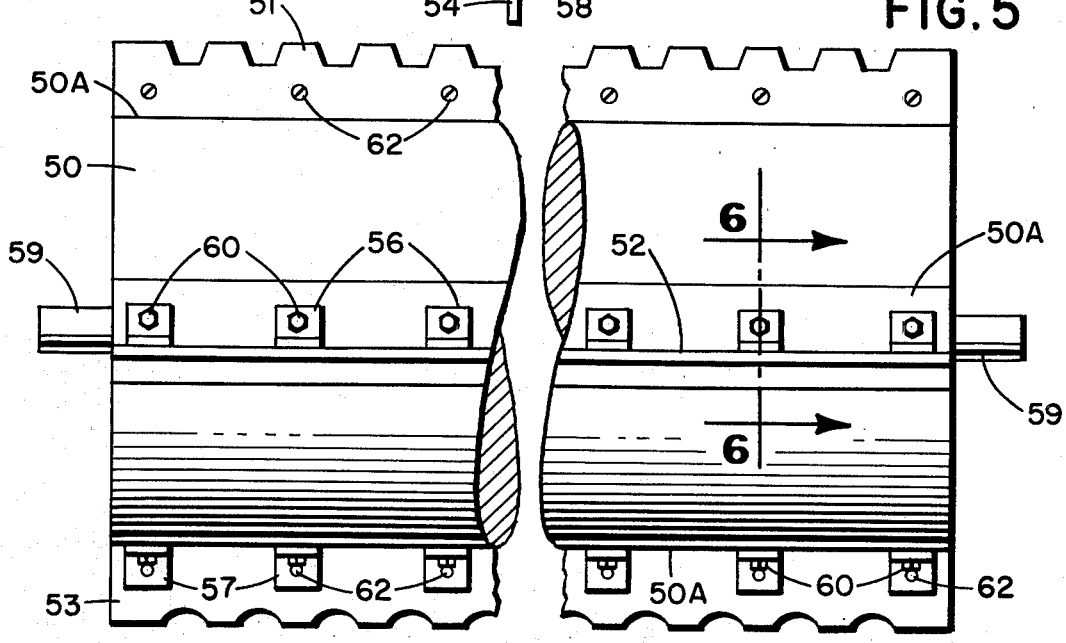
FIG. 5 is a top plan view of the apparatus shown in FIG. 4.
Figure 6:
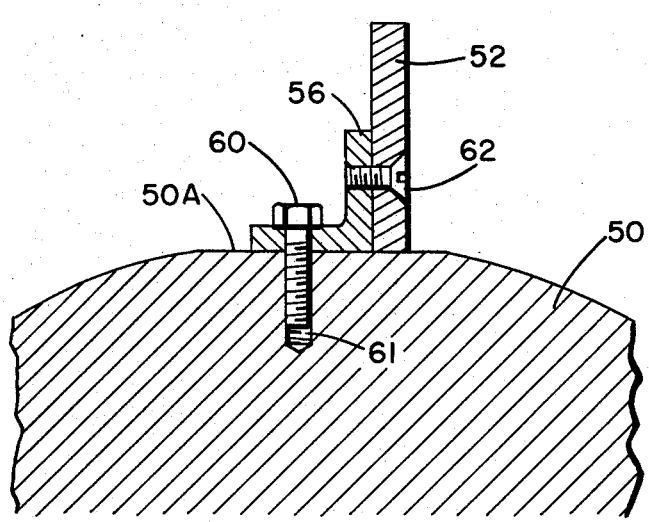
FIG. 6 is a cross sectional view taken along line 6—6 of FIG. 5 showing the means of attachment of one blade member distribution means to the rotatable member.

Side to side oscillation of the distribution apparatus may be used however with the second preferred embodiment of a suitable distribution apparatus shown in FIGS. 4 and 5. This embodiment is a modified doctor blade distribution apparatus comprising a cylindrical rotatable member 50 of generally circular cross section having a number of attached blade distribution means comprising members of length about equal to the rotatable member. These blade members may vary in number from at least 2 to about 6. FIG. 4 shows the preferred embodiment of 4 blade members 51, 52, 53 and 54. FIG. 4 shows that these blade members are attached to the rotatable member 50 by series of bearing brackets 55, 56, 57 and 58. The enlarged view in FIG. 6 shows the means of attaching one of the series of brackets 56 to the rotatable member 50 and to the blade member 52. The rotatable member is flattened somewhat at the surface 50A where it is joined to the bearing bracket by any convenient means such as a cap screw 60 which is screwed into a hole 61 which has been drilled and tapped into the rotatable member. The blade member is attached to the bearing bracket by any convenient means such as a countersunk flat head machine screw 62. The blade members may be readily attached to and detached from the rotatable member using the series of these screws and bearing brackets as shown in FIG. 5. The blade members are attached in a radially outwardly extending manner as shown in FIGS. 4 through 6 so that the most radially distant surface of each may be used as a distribution surface. They are spaced roughly equidistant from one another around the rotatable member so that easy access to the attachment screws may be obtained and so that at any given time the distribution surface of only one of the blade members may be in position for distributing the foamed composition on the substrate.

As with the embodiment shown in FIGS. 2 and 3, the embodiment shown in FIGS. 4 and 5 may be used to produce foamed sheet materials with either planar or patterned surfaces. The latter may be produced by using blade member distribution means wherein the distribution surfaces are serrated. FIG. 5 shows two preferred embodiments of the serrated blade members. Blade member 53 has serrations which are separated repeating uniform radially inwardly extending arcs while blade member 51 has serrations which are separated repeating uniform radially inwardly extending truncated "V" indentations. Foamed sheet materials with planar surfaces may be obtained using a blade member with a smooth distribution surface.

The operation of this embodiment of the distribution apparatus is essentially the same as that described for the first preferred embodiment. The central shaft 59 shown in FIGS. 4 and 5 is the point of attachment which allows the rotatable member to cooperate with the means for raising or lowering, rotating and locking, and oscillating the rotatable member. Oscillation of the rotatable member when using blade member distribution means gives a wavy pattern to the surface of the foamed sheet material. As with the first embodiment the thickness of the foamed sheet material may be altered by raising or lowering the distribution apparatus. Blade members may be changed readily by rotating the rotatable member. Blade members may be easily replaced or removed for cleaning. All of these operations may be carried out in a simple and straightforward manner without stopping the process and this invention therefore provides a significant advantage over the prior art to manufacturers of foamed sheet materials.

The blade members referred to in FIGS. 4 and 5 may be manufactured of suitable material such as stainless steel or a synthetic material such as Nylon. Depending upon the type of guage of the blade, it may deflect during use. Thus, the number of spacing of the brackets should be sufficient to prevent or minimize such deflection.

In describing the present invention the rotatable member has been described as being cylindrical or generally cylindrical in shape. The cross-sectional shape of the rotatable member is not an essential feature of the present invention. The rotatable member could have any convenient cross section such as oval, square, hexagonal. However, the shape must be such that the distribution surface of either the sleeve or the blade member distribution means must be the most radially distant part of the distribution apparatus from its axis of rotation. The preferred embodiment is a rotatable member with a cross section which is circular or nearly circular.

The substrate used in accordance with the present invention is preferably a carpet which may be tufted or woven. Other substrates may be matted materials such as jute, or a variety of non-woven materials such as felt, paper, scrim or rayon diaper stock.

The preferred foamed fluid compositions for use in the present invention are a foamed styrene-butadiene synthetic rubber latex or a polyurethane foam. The use of the invention is illustrated by the following example. All parts and percentages are by weight unless otherwise specified.

EXAMPLE 1

This Example shows the use of styrene-butadiene latex in a no-gel spread foam recipe for a carpet backing in conjunction with the present invention. The composition of the material to be foamed is given in the following Table 1:

TABLE 1

| | |
|---|---|
| Latex (Blend of 95 parts styrene-butadiene latex containing 31% styrene, with 5 parts polystyrene latex) | 100.00 |
| Sodium lauryl sulfate | 0.5 |
| Disodium n-octyldecylsulfosuccinimate | 5.0 |
| Curing paste[1] | 5.9 |
| Calcium carbonate filler | 200.0 |
| Tan colour | 0.5 |

[1] A premixed composition which comprises: sulfur, 1.65 parts; zinc oxide, 1.25 parts; ethyl zimate, 1.00 part; zinc mercaptobenzothiazole, 1.25 parts; diphenylamine acetone reaction product, 0.45 part; butylated reaction product of p-cresol and dicyclopentadiene, 0.30 part.

Figure 7:
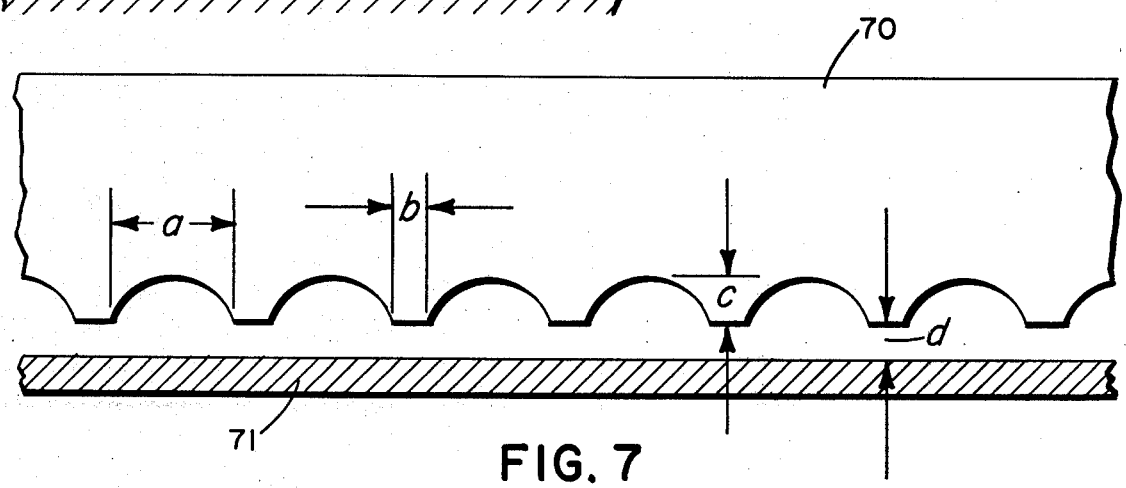
FIG. 7 is an elevational view of a distribution blade in operating position above a carpet substrate which is shown in section.
Figure 8:
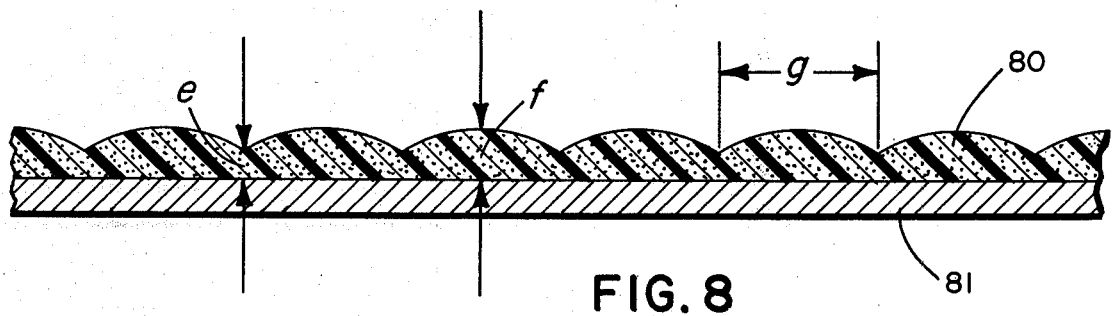
FIG. 8 is a sectional view of a foam backed carpet substrate produced using the distribution means shown in FIG 7.

Water was added to bring the total solids content of the above to 78.5% and the composition was then foamed in a Hobart mixer to a cup weight of 190 g/l. It was spread onto a tufted carpet substrate to produce a foam backed carpet. The distribution means used was the blade member shown in FIG. 7 which was used in conjunction with the distribution apparatus shown in FIGS. 4 and 5. Dimensions of this blade member 70 were: a=0.5 in., b=0.125 in., c=0.1875 in. The distance d between the blade member 70 and the carpet substrate 71 was 0.125 in. The foam backed carpet which was produced after drying and curing under a bank of infrared lamps for 1 minute and then in a 275° F. oven for 30 minutes is shown in FIG. 8. Note that because of some unavoidable spreading of the foam, the surface pattern of the foam backing 80 on the carpet substrate 81 was not identical to the serrated distribution surface of the blade member 70 shown in FIG. 7. The dimensions of the finished carpet shown in FIG. 8 were: e=0.125 in., f=0.25 in., g=0.625 in. The effective thickness of the foam backing is f while the minimum thickness is e.

What is claimed is:

1. An apparatus for continuously distributing a viscous foamed fluid composition which has been applied to a movable substrate which comprises:
    a rotatable member and at least two distribution means wherein said member is a tubular roll with a generally cylindrical shape;
    means cooperating with said member to readily attach and detach said distribution means without ever interrupting the distribution of said composition on said substrate;
    said distribution means being attached to said member in a radially outwardly extending manner so that the most radially distant surface of each of said distribution means is a distribution surface for distributing said composition on said substrate;
    said distribution means being attached to said member so that at any given time the distribution surface of only one of said distribution means is in position for distributing said composition on said substrate;
    each of said distribution surfaces imparting essentially the final surface pattern to said composition when used for distributing said composition;
    said member being positioned above and extending substantially across the surface of said substrate normal to the direction of travel of said substrate;
    means cooperating with said member to rotate said member about the central axis of said member and normal to the direction of travel of said substrate through an angle of one or two times 360° divided by the number of said distribution means;
    locking means cooperating with said member to prevent rotation of said member; and
    means cooperating with said member to oscillate said member from side to side normal to the direction of travel of said substrate.

2. An apparatus according to claim 1 wherein said rotatable member has a generally circular cross section.

3. An apparatus according to claim 2 wherein said distribution means comprises at least 2 to about 4 longitudinal arcuate sections which are of about equal length to and concentric with said rotatable member and whose inner surfaces conform with the external surfaces of said rotatable member.

4. An apparatus according to claim 3 wherein said distribution surfaces of said distribution means are grooved parallel to the direction of travel of said substrate.

5. An apparatus according to claim 4 wherein the grooves, in longitudinal cross-section, are separated repeating uniform radially inwardly extending arcs.

6. An apparatus according to claim 4 wherein the grooves, in longitudinal cross-section, are separated repeating uniform radially inwardly extending truncated "V" indentations.

7. An apparatus according to claim 2 wherein said distribution means comprises at least 2 to about 6 blade members of length about equal to said rotatable manner.

8. An apparatus according to claim 7 wherein said distribution surfaces of said blade members are serrated.

9. An apparatus according to claim 8 wherein the serrations are separated repeating uniform radially inwardly extending arcs.

10. An apparatus according to claim 8 wherein the serratons are separated repeating uniform radially inwardly extending truncated "V" indentations.

* * * * *

UNITED STATES PATENT AND TRADEMARK OFFICE
CERTIFICATE OF CORRECTION

PATENT NO. : 4,354,810
DATED : October 19, 1982
INVENTOR(S) : Warren Darius STIDHAM It is certified that error appears in the above—identified patent and that said Letters Patent is hereby corrected as shown below:

Claim 7, last word, change "manner" to --member--.

Signed and Sealed this

First Day of February 1983

[SEAL]

Attest:

GERALD J. MOSSINGHOFF

Attesting Officer

Commissioner of Patents and Trademarks